(12) United States Patent
Christe et al.

(10) Patent No.: US 6,224,696 B1
(45) Date of Patent: May 1, 2001

(54) PENTANITROGEN(1+)CATION AND SALT CONTAINING THE SAME

(75) Inventors: Karl O. Christe, Calabasas; William W. Wilson, Simi Valley, both of CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/353,859

(22) Filed: Jul. 15, 1999

(51) Int. Cl.[7] .......................... C06B 43/00; C06B 49/00; C01B 21/00
(52) U.S. Cl. ................. 149/109.4; 149/119; 423/249; 423/351
(58) Field of Search .................. 149/109.4, 119; 423/249, 351

(56) References Cited

U.S. PATENT DOCUMENTS 4,107,275 * 8/1978 Christe et al. .................. 149/119
4,172,881 * 10/1979 Christe et al. .................. 423/301
4,711,680 * 12/1987 Christe .......................... 149/109.4

OTHER PUBLICATIONS

Christe, et al., Angew. Chem., Int Ed. (1999), 38(13/14) p. 2004–2009.*

Chivers et al., Inorg. Synth. (1989), 25, 38–40.*

* cited by examiner

Primary Examiner—Edward A. Miller
(74) Attorney, Agent, or Firm—Colin M. Raufer; Leonard A. Alkov; Glenn H. Lenzen, Jr.

(57) ABSTRACT

A homoleptic polynitrogen ion and salts thereof are described as being highly exothermic in nature and thus give rise to compounds useful for propulsion and explosive applications, among others. Also described are processes for the macroscopic production of compounds containing homoleptic polynitrogen.

22 Claims, 8 Drawing Sheets

| | chemical shifts,[a] ppm | | | | |
|---|---|---|---|---|---|
| | observed[b] | | calculated[c] CCSD(T)/QZP | | |
| | $^{15}N$ | $^{14}N$ | $N_1$ | $N_2$ | $N_3$ |
| $[^{15}N_1 - {}^{14}N_2 - {}^{14}N_3 - {}^{14}N_{2'} - {}^{14}N_{1'}]^+$ | −237.3 | −165.3[d] | −235 | −166 | −95 |
| $[^{14}N_1 - {}^{14}N_2 - {}^{15}N_3 - {}^{14}N_{2'} - {}^{14}N_{1'}]^+$ | −100.4 | | | | |

(a) Chemical shifts are given relative to neat $CH_3NO_2$ as external standard. (b) The spectra were recorded hydrogen-coupled at −63 °C in anhydrous HF solution which was acidified with $AsF_5$. (c) An empirical correction of −20 ppm was applied to all calculated values, based on a comparison between the calculated and observed shifts of a number of closely related molecules and ions. (d) The other two resonances are badly exchange broadened and were not detected in the $^{14}N$ spectrum.

FIG. 5

| observed freq. cm⁻¹ (rel intens) | | assignt (point group) | | calcd freq.[a], (intens)[b] | |
| --- | --- | --- | --- | --- | --- |
| Raman −130°C | IR −196°C | ¹⁴N₅⁺(C₂ᵥ) | AsF₆⁻(Oₕ) | B3LYP | CCSD(T) |
| 2271 [44] | 2270 m | $\nu_1(A_1)$ | | 2336 (22) | 2229 (13) [215][c] |
| 2211 [8] | 2210 s | $\nu_7(B_2)$ | | 2282 (147) | 2175 (105) [42] |
| | 1088 s | $\nu_8(B_2)$ | | 1167 (141) | 1032 (138) [2] |
| 871 [7] | 872 w | $\nu_2(A_1)$ | | 850 (4) | 818 (0.5) [5] |
| | 704 vs | | $\nu_3(F_{1u})$ | | |
| 686 [100] | 680 sh | | $\nu_1(A_{1g})$ | | |
| 672 [17] ⎫ | | $\nu_3(A_1)$ | or part of $\nu_1(A_{1g})$ | 678 (1) | 644 (2) [1] |
| 669 [18] ⎭ | | | or $\nu_3(F_{1u})$ | | |
| 579 [16] | 575 w | | $\nu_2(E_g)$ | | |
| | | $\nu_5(A_2)$ | | 502 (0) | 475 (0) [1] |
| | 420 sh | $\nu_6(B_1)$ | | 424 (7) | 405 (6) [0] |
| | | $\nu_9(B_2)$ | | 436 (0.6) | 399 (1) [0.5] |
| | 394 vs | | $\nu_4(F_{1u})$ | | |
| 372 [32] | 380 sh ⎫<br>360 sh ⎭ | | $\nu_5(F_{2g})$ | | |
| 209 [44] | | $\nu_4(A_1)$ | | 193 (0.5) | 181 (0.3) [6] |
| 127 [55] | | lattice vibration | | | |

(a) Using a 6-311 + G(2d) basis set. (b) IR intensities (given in parentheses) in km/mol; Raman intensities [given in brackets] in Å⁴/amu.   (c) The Ra intensities were calculated at the RHF level.

FIG. 6

| $N_5^+$ Isotopomer | | | | | calculated frequencies (shifts), cm$^{-1}$ | | | | | | observed frequencies (shifts), cm$^{-1}$ | | | | | |
|---|---|---|---|---|---|---|---|---|---|---|---|---|---|---|---|---|
| N(1)-N(2)-N(3)-N(2)-N(1) | $\nu_4(A_1)$ | $\nu_9(B_2)$ | $\nu_8(B_2)$ | $\nu_3(A_1)$ | $\nu_2(A_1)$ | $\nu_7(B_2)$ | $\nu_6(B_2)$ | $\nu_1(B_2)$ | $\nu_1(A_1)$ | $\nu_2(A_1)$ | | $\nu_1(B_2)$ | | $\nu_1(A_1)$ | |
| | | | | | | | | | | IR | RA | IR | RA | IR | RA |
| 14 14 14 14 14 | 193.1(0) | 424.1(0) | 436.3(0) | 502.4(0) | 678.1(0) | 850.0(0) | 1116.9(0) | 2281.7(0) | 2336.3(0) | 872(0) | 871(0) | 2210(0) | 2211(0) | 2271(0) | 2271(0) |
| 14 14 15 14 14 | 191.8(1.3) | 422.0(2.1) | 436.0(0.2) | 502.4(0) | 677.5(.7) | 833.3(16.7) | 1138.0(28.9) | 2281.3(.5) | 2336.3(.1) | 858(14) | 855(16) | 2209.8 | 2211(1) | 2270.8 | 2271(0) |
| 15 14 14 14 14 | 190.8(2.2) | 423.3(1.8) | 434.7(1.5) | 500.7(1.7) | 674.4(3.7) | 847.4(2.6) | 1163.4(3.5) | 2259.8(21.9) | 2324.5(11.9) | 870(2) | 869(2) | 2189.0(21) | 2190(21) | 2259.0(12) | 2259(12) |

FIG. 7

| approx mode description in point group $C_{2v}$ | | frequency, cm$^{-1}$ | | symmetry force constants[b], CCSD(T) (B3LYP) | | | | potential energy distribution[a], % |
|---|---|---|---|---|---|---|---|---|
| | | obsd | calcd CCSD(T) (B3LYP) | | | | | CCSD(T) |
| $A_1$ | $\nu_1$ in phase terminal stretches | 2270 | 2229 (2336) | $F_{11}$ 19.573(21.314) | | | | 93(1) + 6(2) |
| | $\nu_2$ sym central stretch | 872 | 818 (850) | $F_{22}$ 0.702(0.843) | 5.546(6.952) | | | 62(2) + 23(3) + 13(4) + 2(1) |
| | $\nu_3$ central bending | 644 | 644 (678) | $F_{33}$ -0.085(-0.137) | 1.377(1.535) | 1.540(1.427) | | 39(3) + 33(2) + 23(4) + 5(1) |
| | $\nu_4$ in phase terminal bends | 209 | 181 (193) | $F_{44}$ 0.167(0.171) | 0.204(0.312) | 0.120(0.108) | 0.373(0.425) | 64(4) + 37(3) − 1(2) |
| $A_2$ | $\nu_5$ torsion | | 475 (502) | $F_{55}$ 0.0266(0.0281) | | | | 100(5) |
| $B_1$ | $\nu_6$ torsion | | 405 (424) | $F_{66}$ 0.0236(0.0246) | | | | 100(6) |
| $B_2$ | $\nu_7$ out of phase term stretch | 2210 | 2175 (2282) | $F_{77}$ 19.491(21.272) | $F_{88}$ | $F_{99}$ | | 96(7) + 4(8) |
| | $\nu_8$ asym central stretch | 1088 | 1032 (1167) | $F_{88}$ 1.197(1.359) | 4.780(5.927) | | | 95(8) + 4(7) |
| | $\nu_9$ out of phase terminal bends | 399 | 399 (436) | $F_{99}$ 0.200(0.195) | 0.085(0.159) | 0.358(0.423) | | 99(9) + 1(8) |

(a) The following symmetry coordinates were used for [N1-N2-N3-N2'-N1']†: $S_1=\nu(1-2)+\nu(1'-2')$; $S_2=\nu(2-3)+\nu(2'-3)$;
$S_3=\delta(2-3-2')$; $S_4=\delta(1-2-3)+\delta(1'-2'-3)$;
$S_5=\tau(1-2-3-2')+\tau(2-3-2'-1')$; $S_6=\tau(1-2-3-2')-\tau(2-3-2'-1')$; $S_7=\nu(1-2)-\nu(1'-2')$; $S_8=\nu(2-3)-\nu(2'-3)$; $S_9=\delta(1-2-3)-\delta(1'-2'-3)$. (b) The two most important internal force constants, estimated from the calculated symmetry force constants and the observed frequencies are $f_{(1-2)}=20.08$ mdyn/Å and $f_{(2-3)}=6.59$ mdyn/Å. Stretching constants in mdyn/Å, deformation constants in mdyn·Å/rad$^2$, and stretch-bend interaction constants in mdyn/rad.

FIG. 8

PENTANITROGEN(1+)CATION AND SALT CONTAINING THE SAME

This invention was made with Government support under Contract No. F04611-93-C-0005 awarded by the Department of the Air Force. The Government has certain rights in this invention.

TECHNICAL FIELD

This invention relates to methods of synthesizing pentanitrogen(1+)cations to salts and other compounds made from pentanitrogen(1+)cation and methods of producing the salts and other compounds therefrom.

TECHNICAL BACKGROUND

Polynitrogen compounds are of significant interest as high energy density materials (HEDM), particularly for propulsion or explosive applications. In spite of numerous theoretical studies predicting that certain all-nitrogen compounds might be stable, to date, experimental studies aimed at their actual synthesis have been unsuccessful.

Presently, only two homoleptic polynitrogen species are known which can be prepared on a macroscopic scale: dinitrogen, $N_2$, which was independently isolated in pure form from air in 1772 by Rutherford, Scheele, and Cavendish; and the azide anion, $N_3^-$, discovered in 1890 by Curtius. Other species, such as $N_3$., $N_3^+$, and $N_4^+$ have been observed only as free gaseous or matrix-isolated ions or radicals. In spite of the extensive theoretical studies hypothecating that species such as $N_4$ ($T_d$), $N_8$, ($O_h$), $N(N_3)_2^-$, $N(N_3)_3$, and $N(N_3)_4^+$, and $N_5^+$ (Prykko and Runeberg, T. Mol. Struct. Trichem 1991, 234, 279) are vibrationally stable, the lack of a single successful synthesis of a new species on a macroscopic scale is surprising and may reflect the great experimental difficulties resulting from their high endothermicities, which give rise to instability and unpredictable explosiveness.

The high energy content of polynitrogen candidates stems, at least in part, from the N—N single and double bonds they possess, with average bond energies of 38.2 and 99.9 kcal/mol, respectively. These bond energies are significantly less than the $N_2$ triple bond energy of 228 kal/mol. Therefore, any transformation of a polynitrogen compound to $N_2$ molecules is accompanied by a very large energy release and any new metastable polynitrogen compound will be isolable and manageable only if it possesses a sufficiently large energy barrier to decomposition.

SUMMARY OF THE INVENTION

The present invention is directed to the synthesis of catenated polynitrogen species, particularly the pentanitrogen (1+).

As a result of our synthesis of the pentanitrogen (1+) cation, otherwise referred to herein as $N_5^+$, we have further synthesized and characterized $N_5^+AsF_6^-$ and $N_5^+SbF_6^-$, which constitute only the third known compounds containing a homoleptic polynitrogen moiety that is preparable on a macroscopic scale.

DETAILED DESCRIPTION OF THE FIGURES

FIG. 8 illustrates in a table format results from the normal coordinate analysis of $N_5^+$.

DETAILED DESCRIPTION OF THE INVENTION

Figure 1:
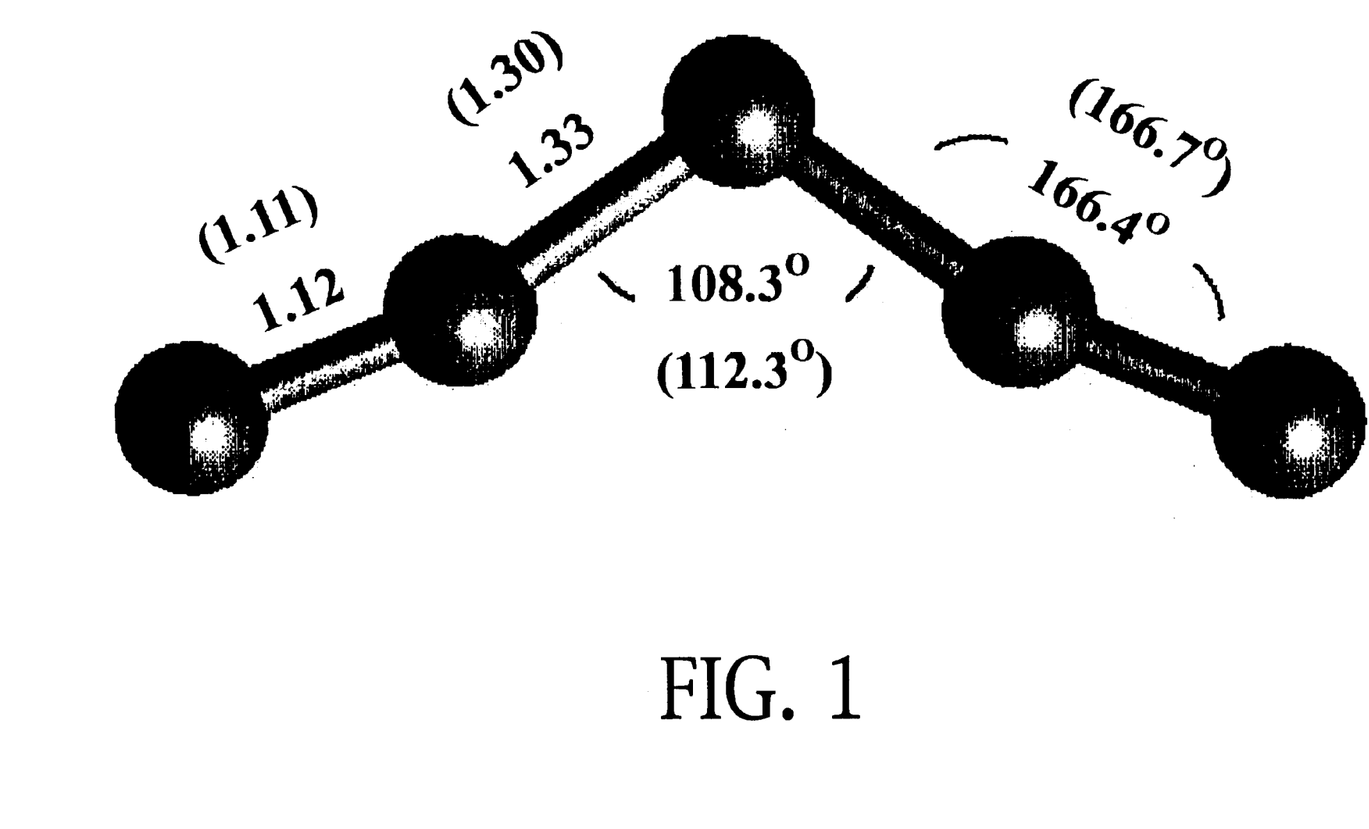
FIG. 1 illustrates the optimized geometries of $N_5$+ calculated at the B3LYP/ and CCSD(T)/6-311+G(2d) levels of theory wherein the values given in parentheses are the B3LYP values.

Theoretical calculations were used to predict whether the candidate $N_5^+$ is vibrationally stable and spectroscopic properties (for example, infrared, Raman and NMR) were calculated to aid in the identification and characterization. For $N_5^+$ these calculations predict the stable $C_{2v}$ structure depicted in FIG. 1.

To carry out one synthesis process of the present invention, energetic starting materials that already possess the energy enhancing weakened bonds, the required formal charges and suitable ligands that allow for an exothermic and facile coupling reaction of the starting materials are utilized. Since the subject of the present invention is the $N_5^+$ cation, the presence of a formal positive charge in one of the starting materials is very important in view of the high first ionization potential of $N_2$ (359 kcal/mol). The following reaction scheme demonstrates why the $N_2F$+cation and $HN_3$ are ideal starting materials for the synthesis of $N_5^+$ because they already possess the desired types of bonds, $N_2F^+$ provides the formal positive charge and in view of the weak N—F and strong H—F bond, the H—F elimination reaction is exothermic.

Also required is a reaction medium that offers a good solubility at low temperatures, can act as a heat sink for exothermic reactions and can stabilize a product that is potentially shock sensitive. As such, anhydrous HF was chosen because of its high dipole moment, low melting point ($-80°$ C.) and high volatility.

Application of these principles led to the synthesis of $N_5$+according to the following reaction scheme:

A small excess of $HN_3$ was used to ensure complete conversion of the $N_2F^+AsF_6^-$. The only detectable by-product was less than 20 mol % of protonated $HN_3$, formed according to

The $AsF_5$ required for the protonation of $HN_3$ to proceed could have formed by decomposition of some $N_5^+$, or less likely, by hydrolysis of $N_5^+$, with traces of water in the system.

$$4N_5^+ + AsF_6^- + 2H_2O \rightarrow 4HF + 4AsF_5 + 10N_2 + O_2$$

For the synthesis of $^{15}N$-labeled $N_5^+$, $^{15}N$-labeled $HN_3$ was prepared from stearic acid and $^{15}N$-labeled $Na^+N_3^-$.

The reaction of labeled $HN_3$ with $N_2F^+AsF_6^-$ produced a roughly equimolar mixture of $N_5^+$ with N* in either the 1 or 3 positions, as shown below.

The $N_5^+AsF_6^-$ product obtained by the foregoing reaction is a white solid that is sparingly soluble in anhydrous HF. It is marginally stable at 22° C. and can be stored for weeks at −78° C. without noticeable decomposition. It can be handled both in HF solution or as a solid and is not prone to exploding during careful normal handling. It is a powerful oxidizer, capable of igniting organic substances such as foam rubber even at low temperatures. It is important to note that the reaction of $N_2F^+AsF_6^-$ with water is violently explosive and should be avoided.

While the first ionization potential of $N_5$ or the electron affinity of $N_5^+$ was not calculated because of the difficulty of finding a meaningful geometry for $N_5$, which corresponds closely to that of $N_5^+$, the high energy density of $N_5^+$ was confirmed by a calculation using the $G_2$ method that gave formation enthalpies of $\Delta Hf=353$ and $\Delta Hf^{298}=351$ kcal/mol for free gaseous $N_5^+$.

Solid $^{15}N$-labeled $N_5^+AsF_6^-$ in a 3 mm quartz tube was warmed in a stepwise manner from −78 to +22° C. under a vacuum of $10^{-7}$ torr while monitoring the volatile products with a mass spectrometer; the principal decomposition product detected was $N_2$. After pumping at 22° C. for 20 minutes, however, most of the solid remained and was identified by low temperature Raman spectroscopy as $N_5^+AsF_6^-$, thus demonstrating that the compound has a reasonable lifetime at room temperature. In samples prepared from an excess of $HN_3$ and containing some $H_2N_3^+$ as a by-product, $HN_3$ and its fragments, HF and $AsF_5$ were also observed in the mass spectra.

Figure 2:
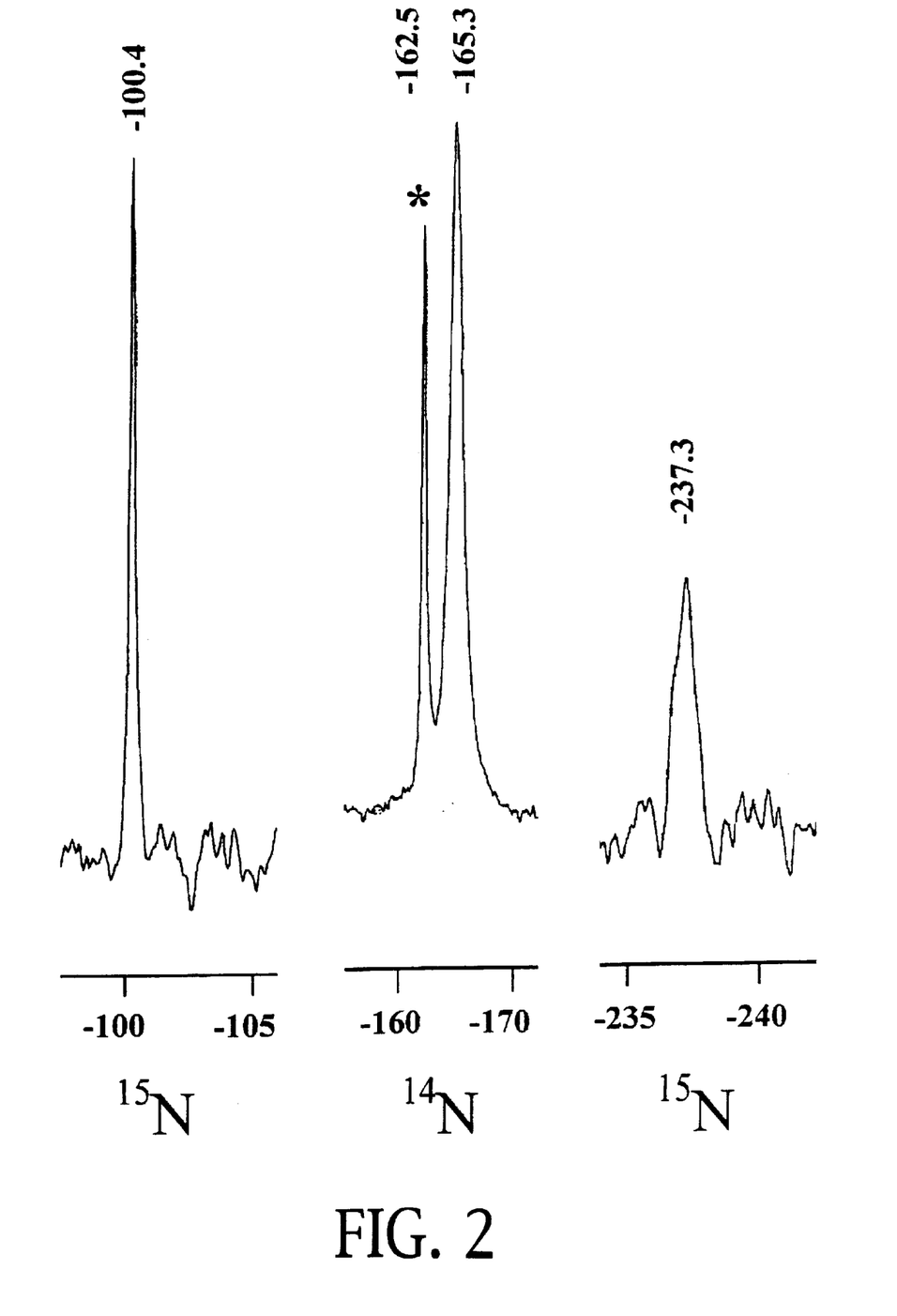
FIG. 2 illustrates the nitrogen NMR data for an equimolar mixture of singly $^{15}N$-labeled $[^{15}N^{14}N^{14}N^{14}N^{14}N]^+$ and $[^{14}N^{14}N^{15}N^{14}N^{14}N]^+AsF_6^-$ recorded at $-63°$ C. in anhydrous HF solution that was acidified with 2 mol % $AsF_5$.
Figure 5:
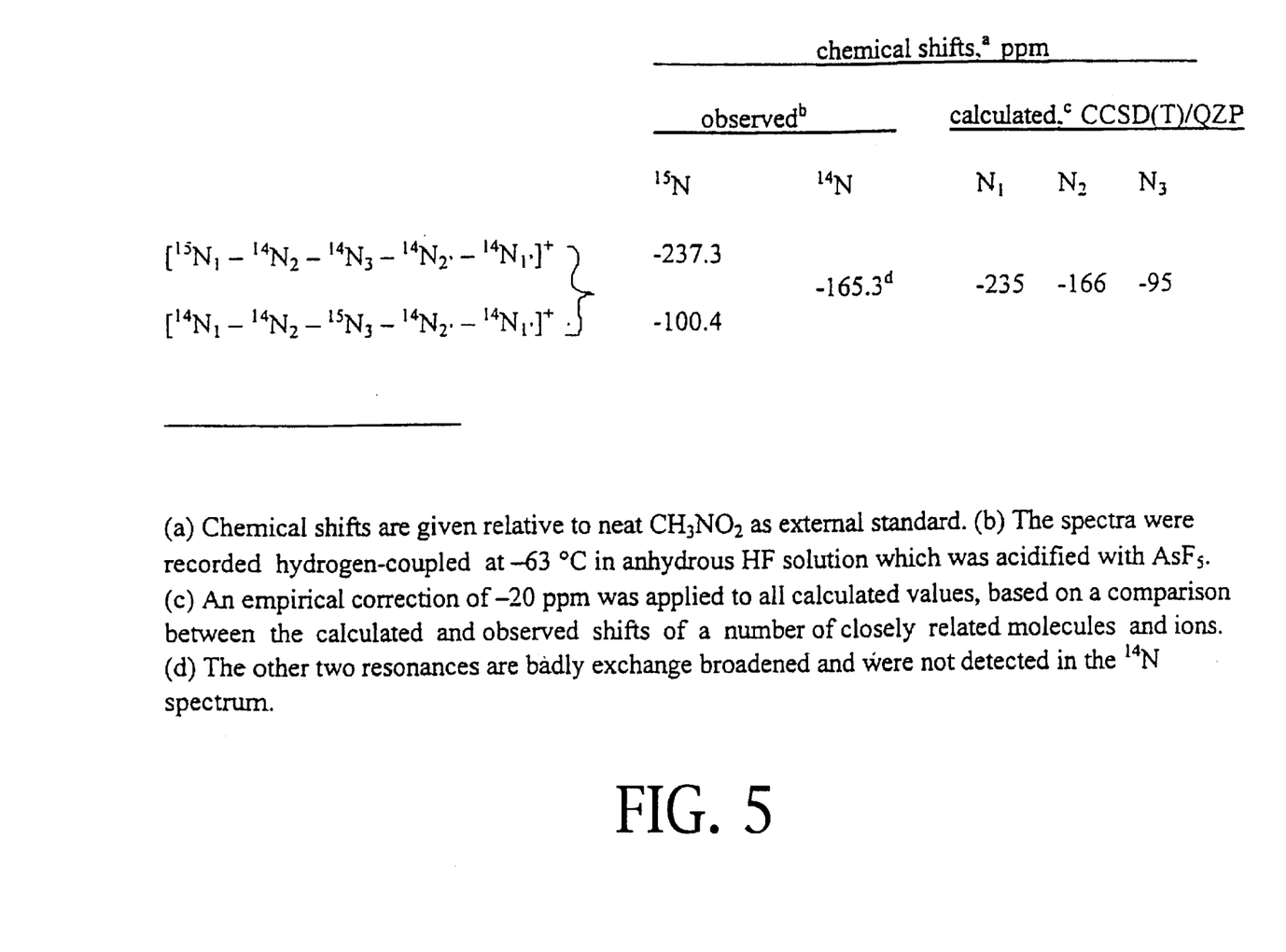
FIG. 5 illustrates as Table I both the observed and calculated nitrogen NMR data for $N_5^+$.

The $^{14}N$ and $^{15}N$ NMR spectra of $N_5^+$, labeled in either the 1 or 3 position, and the $^{14}N$ NMR spectrum of unlabeled $N_5^+$ were recorded at −63° C. in anhydrous HF solution that was acidified with about 2 mol % of $AsF_5$ to slow down a potential exchange between the cation and the solvent. The spectra of the $^{15}N$-labeled mixture are shown in FIG. 2 and the observed and calculated chemical shifts are compared in FIG. 5.

The signals due to N1 and N3 were observable in the $^{15}N$ spectrum at $\delta=-237.3$ and $-100.4$ ppm, respectively, which corresponds closely with the calculated values of −235 and −95 ppm. The signal to noise ratio of the $^{15}N$ spectrum was low due to the poor solubility of $N_5^+AsF_6^-$ in HF at −64° C. and the long delay of 60 sec which was needed because of the slow relaxation rates. The area ratio of the two signals was about 1:1, indicating that the synthesis of $HN_3$ from end labeled $N_3^-$ and stearic acid had resulted in about equimolar quantities of $N_{\alpha^-}$ and $N_{\gamma}$-labeled $HN_3$. In addition to the two $N_5^+$ signals two weaker signals at $\delta=-312.0$ (tr with $^1J_1H$—$^{15}N=100.7$ Hz) and −114.4 (s), ppm were observed in the hydrogen-coupled spectrum that are attributable to $N_\alpha$ and $N_\gamma$ respectively, of $[H_2N_\alpha N_\beta N_\gamma]^+$. This was verified by recording the spectrum of a known sample of $H_2N_3^+AsF_6^-$ in HF solution.

In the $^{14}N$ spectrum of labeled and unlabeled $N_5^+AsF_6^-$, a single resonance at $\gamma=-165.3$ ppm was observed and assigned to N2 of $N_5^+$ based on the calculated value of −166 ppm. The signals due to N1 and N3 could not be observed in the $^{14}N$ spectra under these conditions due to excessive quadrupole broadening. The $N_\beta$ signal of $[H_2N_\alpha N_\beta N_\gamma]^+$ was also observable in the $^{14}N$ spectra of the labeled and unlabeled cations as a sharp resonance at $\delta=-162.5$ ppm, while $N_\alpha$ and $N_\beta$ were strongly quadrupole broadened. Since the N2 atom of $N_5^+$ gives rise to a sharp $^{14}N$ signal and since the single $^{15}N$ substitution provided us with an equal mixture of $^{15}N$ labels on N1 and N3, unambiguous observation of all three signals of $N_5^+$ was possible. Their excellent agreement with the calculated values provides verification for the presence of a $C_{2v}$ symmetry $N_5^+$ cation.

Figure 3:
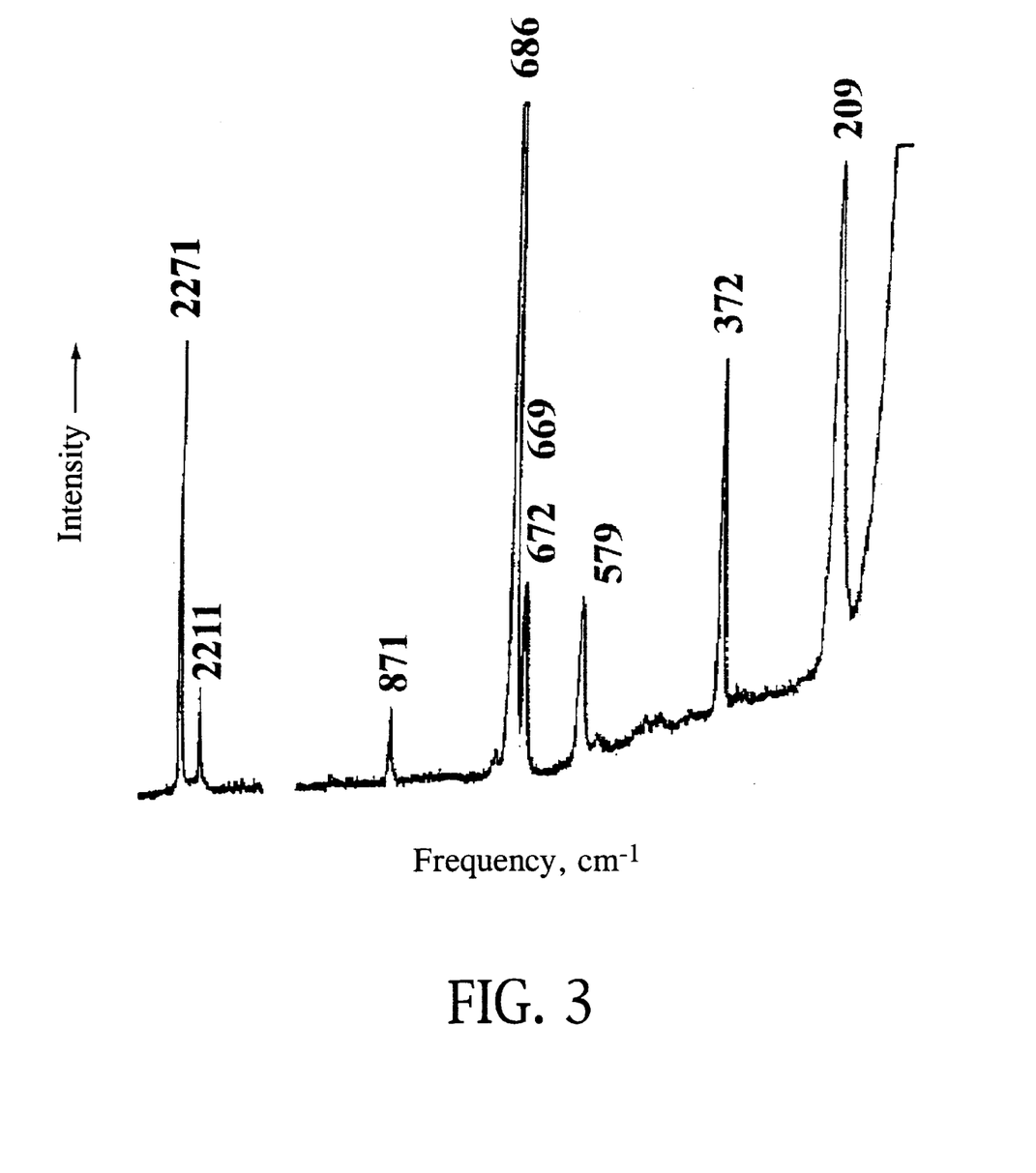
FIG. 3 illustrates a low temperature Raman spectrum of unlabeled solid $N_5^+AsF_6^-$.
Figure 4:
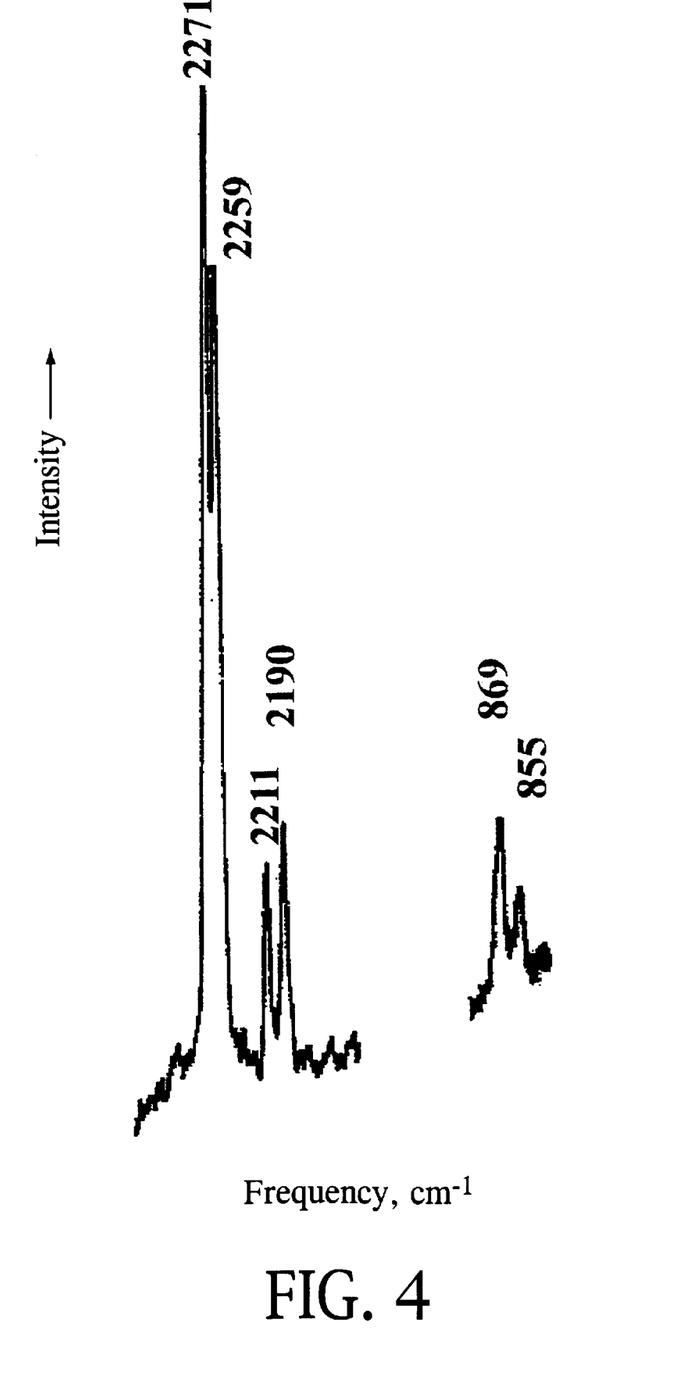
FIG. 4 illustrates a low temperature Raman spectrum of an equimolar mixture of solid $[^{15}N^{14}N^{14}N^{14}N^{14}N]_+$ and $[^{14}N^{14}N^{15}N^{14}N^{14}N]^+AsF_6^-$.
Figure 6:
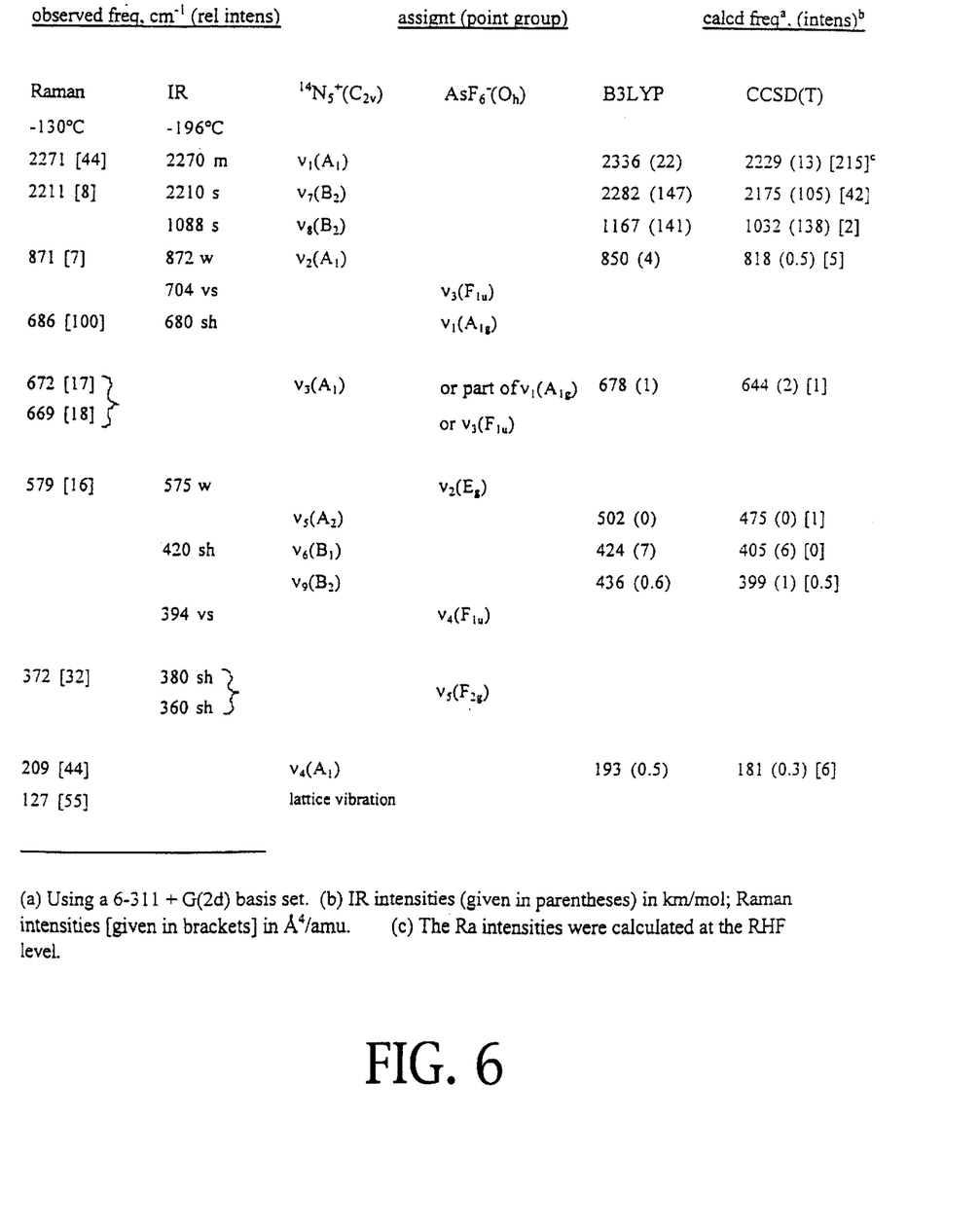
FIG. 6 illustrates as Table II low temperature Raman and infrared spectra of solid $^{14}N_5^+AsF_6^-$ and their assignments compared to the calculated values.
Figure 7:
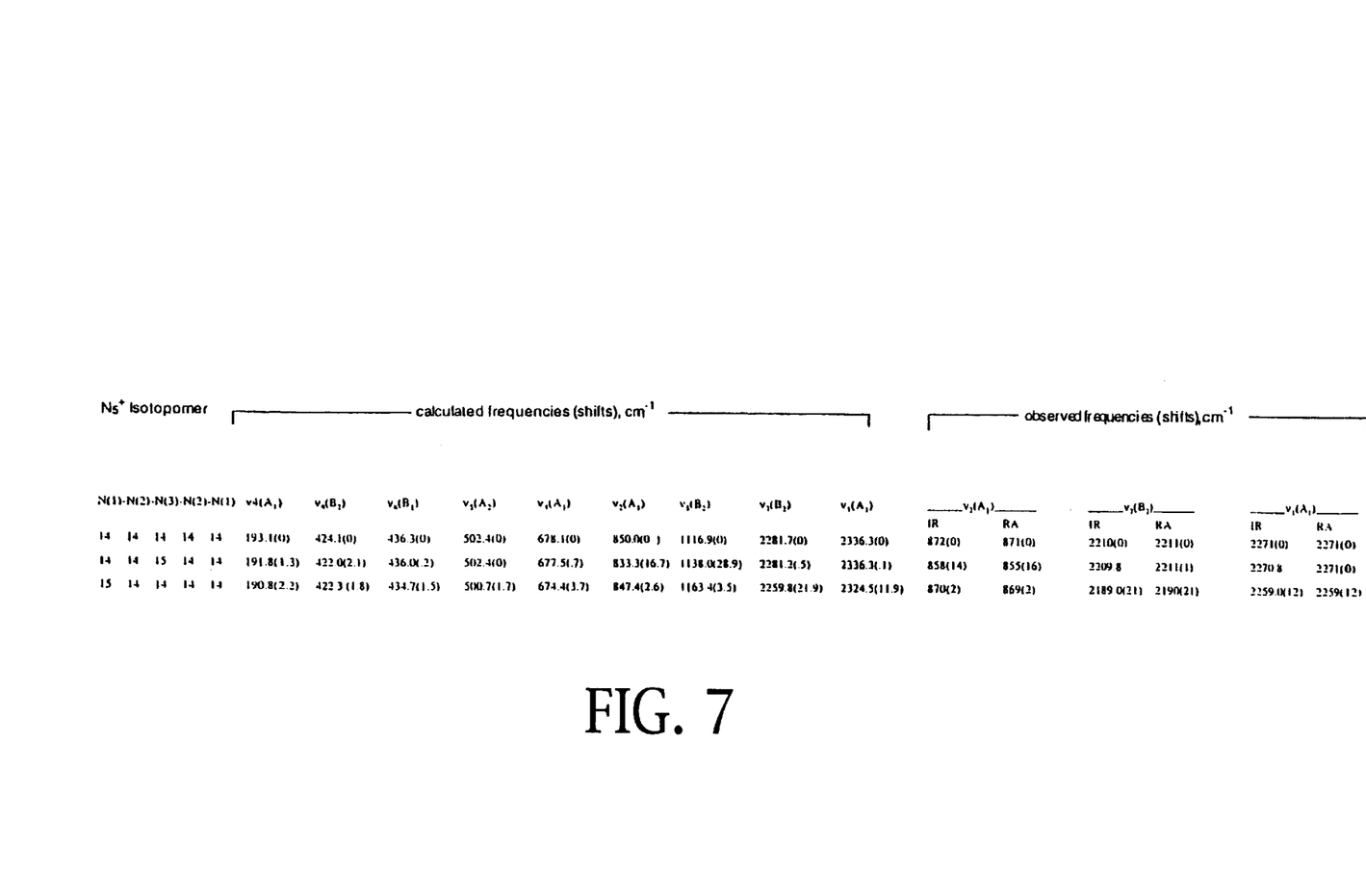
FIG. 7 illustrates in a table format a comparison of the calculated B3LYP and observed $^{15}N$ isotopic shifts for $N_5^+$.

Additional unambiguous proof for the presence of $C_{2v}$—$N_5^+$ was provided by the vibrational spectra of $N_5^+AsF_6^-$ and the N—N isotopic shifts, observed for the mixture of N1 and N3 N-labeled $N_5^+AsF_6^-$. The low temperature Raman spectra of unlabeled and a mixture of N1- and N3-labeled $N_5^+AsF_6^-$ are shown in FIGS. 3 and 4, respectively, and the observed frequencies are summarized in FIGS. 6 and 7. The vibrational assignments for octahedral $AsF_6^-$ in FIG. 6 are well established and do not require any further discussion; those for $N_5^+$ are based on our calculations. As can be seen, the four N—N stretching modes were observed with the predicted frequencies and intensities.

The spectra of N1- and N3-labeled $N_5^+$ allowed accurate measurements of the isotopic shifts for modes $v_2(A_1)$, $v_7(B_2)$ and $V_1(A_1)$. Again, the agreement between experiment and theory is very good and confirms the validity of the predicted structure given in FIG. 1. Since the observed frequencies of $N_5^+$ are intermediate between those predicted at the CCSD(T) and the B3LYP levels of calculation, the actual geometry of $N_5^+$ is likely to be intermediate between the CCSD(T) and B3LYP values of FIG. 1. Therefore, the following geometry is interpolated for $[N1-N2-N3-N2-N1]^+$: $r(N1-N2)=1.11$ Å, $r(N2-N3)=1.315$ Å, $\angle(N1-N2-N3)=166.6°$, and $\angle(N2-N3-N2)=110.3°$.

The results from a normal coordinate analysis of $N_5^+$ are summarized in FIG. 8. They show that the $A_2$, $B_1$ and $B_2$ vibrations and $v_1(A_1)$ are all highly characteristic, but that $v_2(A_1)$ is a mixture of stretches and bends.

The internal force constants of greatest interest are the stretching force constants $f_r$ and $f_R$ of the terminal and the central N—N bonds, respectively. Interpolation of the data in FIG. 8 and adjustments for the observed frequencies give values of 20.08 and 6.59 mdyn/Å for the terminal and the central N—N stretching force constants, respectively. The former value is significantly lower than the 22.4 mdyn/Å found for the N≡N triple bond in $N_2$, whereas the latter value is between those found for typical N—N single ($f_{N-N}$=3.6 mdyn/Å) and N=N double ($f_{N=N}$=10.2 mdyn/Å) bonds. The strengthening of the N—N central bonds at the expense of the terminal bonds, as suggested by its resonance structures, explains the relative stability of $N_5^+$ toward $N_2$ elimination.

The following examples are given to illustrate the method of the present invention and should not be construed in limitation thereof.

EXAMPLE 1

$N_2F^+AsF_6^-$ (1.97 mmol) was loaded in the drybox into a 0.75 inch outer diameter Teflon FEP ampule that was closed by a stainless steel valve. On the metal vacuum line, anhydrous HF(~3 mL) was added at −196° C. and the was warmed to room temperature to dissolve the $N_2F^+AsF_6^-$. The ampule was connected to the glass line and $HN_3$ (2.39 mmol) was added at −196° C. The ampule was reconnected to the metal line and allowed to warm to −78° C., where it was kept for three days with occasional gentle agitation. The ampule was then cooled to −196° C. to check for the presence of volatile products. Nitrogen (0.76 mmol) was identified by mass spectroscopy. All material volatile at −64° C. was pumped off for 8 hours leaving behind a white solid residue that was identified by low temperature vibrational and $^{14}N/^{15}N$ NMR spectroscopy as a mixture of $N_5^+AsF_6^-$ (~80 mol %) and $H_2N_3^+AsF_6^-$(~20 mol %).

EXAMPLE 2

$N_5^+SbF_6^-$ was prepared in an analogous manner from $N_2^+SbF_6^-$ and $HN_3$ in anhydrous HF solution. The $N_5^+SbF_8^-$ salt is a white solid which is stable at room temperature and exhibits the same spectroscopic features characteristic for $N_5^+$, as $N_5^+AsF_6^-$.

EXAMPLE 3

$^{15}N$-labeled $N_5^+AsF_6^-$ was also prepared according to the foregoing procedure for unlabeled $N_5^+AsF_6^-$, except for using a mixture of $HN_3$ that was N-labeled in either the Nα or $N_\gamma$ position.

While it will be apparent that the preferred embodiments of the invention disclosed are well calculated to fulfill the objectives stated, it will be appreciated that the invention is susceptible to modification, variation and change without departing from the spirit thereof.

What is claimed is:

1. A process for producing pentanitrogen (1+) cations comprising the step of:
   a) reacting $N_2F^++HN_3$ to yield $N_5^++HF$.

2. The process of claim 1 wherein said $N_5^+$ has the following $C_{2v}$ structure:

3. The process of claim 1 wherein at least step a) of said reaction is carried out at a temperature of between about −80° C. to 25° C.

4. The process of claim 1 wherein said reaction is carried out below atmospheric pressure.

5. A propulsion composition comprising a compound made according to the process of claim 1.

6. An explosive composition comprising a compound made according to the process of claim 1.

7. The process of claim 1 wherein at least one N atom of the $N_5^+$ cation is an N isotope other than $^{14}N$.

8. The process of claim 8 wherein said isotope is $^{15}N$.

9. A process for producing a pentanitrogen (1+) salt comprising the steps of:
   a) reacting $N_2F^++NH_3$ to yield $N_5^++HF$; and
   b) reacting the $N_5^+$ with at least one anion to form an $N_5^+$ based salt.

10. The process of claim 9 wherein said at least one anion is selected from the group consisting of $AsF_6^-$, $SbF_6^-$ and mixtures thereof.

11. The process of claim 9 wherein said $N_5^+$ has the following $C_{2v}$ structure:

12. The process of claim 9 wherein at least step a) of said reaction is carried out at a temperature of between about −80° C. to 25° C.

13. The process of claim 9 wherein said reaction is carried out below atmospheric pressure.

14. The process of claim 9 wherein at least one N atom of the $N_5^+$ cation is an N isotope other than $^{14}N$.

15. The process of claim 14 wherein said isotope is $^{15}N$.

16. A propulsion composition comprising a compound made according to the process of claim 9.

17. An explosive composition comprising a compound made according to the process of claim 9.

18. A stable, homoleptic, catenated polynitrogen cation having an $N_5^+$ structure.

19. The $N_5^+$ polynitrogen cation of claim 18 wherein said cation is reacted with an anion selected from the group consisting of $AsF_6^-$, $SbF_6^-$ and mixtures thereof.

20. A composition comprising a compound based on one or more $N_5^+$ cations.

21. The composition of claim 20 wherein said composition is a propulsion composition.

22. The composition of claim 20 wherein said composition is an explosive composition.

* * * * *